No. 677,996. Patented July 9, 1901.
G. KLEINERT.
EYEGLASSES.
(Application filed Jan. 22, 1901.)

(No Model.)

WITNESSES:
Ella L. Giles
Clara D. Frohlich

INVENTOR
Georg Kleinert
By Richards & Co.
ATTORNEYS

UNITED STATES PATENT OFFICE.

GEORG KLEINERT, OF DRESDEN, GERMANY.

EYEGLASSES.

SPECIFICATION forming part of Letters Patent No. 677,996, dated July 9, 1901.

Application filed January 22, 1901. Serial No. 44,259. (No model.)

*To all whom it may concern:*

Be it known that I, GEORG KLEINERT, merchant, a subject of the Emperor of Germany, and a resident of Dresden, Saxony, Germany, have invented new and useful Improvements in Eyeglasses; and I declare that the following is a full and clear description of same.

My invention relates to pince-nez or eye glasses adapted to be supported and retained upon the wearer's nose by pads secured between the two lenses and forced toward each other by a spring bridge-piece.

The object of the invention is to provide means for changing the pads easily and quickly and also for changing the bearing-surface of the pads without removing the pads from their retainers.

To this end the invention includes a shaft or spindle secured to the frame of each lens, pads having a plurality of bearing-surfaces turnably mounted on said spindles, and a spring bridge-piece provided with ends coacting with the spindles to retain the pads in place.

The accompanying drawings represent the invention.

Figure 1:
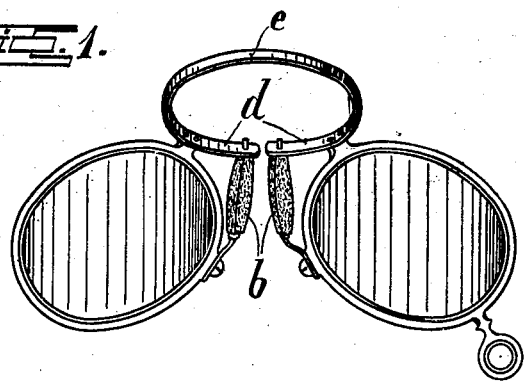
Figure 2:
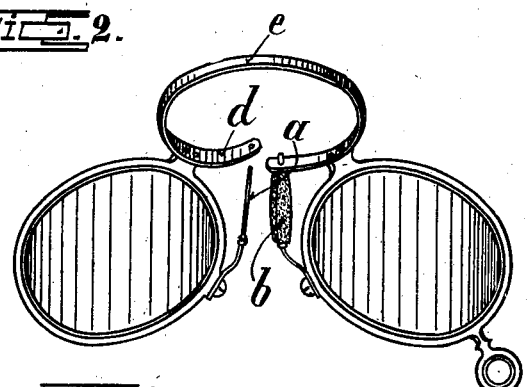
Figure 3:
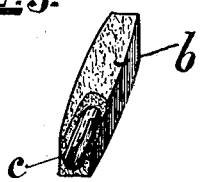

Figure 1 shows eyeglasses with the two pads. Fig. 2 shows the eyeglasses, one of the pads being removed. Fig. 3 represents the pad.

To the frame of each lens the lower end of a spindle $a$ is secured, upon which are journaled pads $b$, having a plurality of bearing-faces. Each pad may be provided with an interior bearing-sleeve. When the pads are mounted on the spindles, their lower ends rest against collars 3. The spring-bridge $e$ is provided with free spring ends $d$, extending beyond the connections between said bridge and lens-frames. Each end is provided with an opening adapted to receive the end of the adjacent spindle. These spring ends press upon the upper ends of the pads and retain them in place.

If the parts of the pads touching the nose are moistened by the perspiration of the skin, one may easily turn the pads that the dry parts of same lie near the nose. The changing of such a pad is readily effected by lifting the end $d$ of the spring $e$. The pad may then easily be drawn from the staff $a$ and be restored by another.

The present arrangement is equally adapted for spectacles as for eyeglasses.

I claim—

In combination, lens-frames, spindles supported therefrom, nose-pads having a plurality of bearing-faces and loosely mounted on said spindles so that they may be rotatably adjusted thereon, and means engaging the pads to hold them in adjusted position; substantially as described.

In witness whereof I have hereunto set my hand in presence of two witnesses.

GEORG KLEINERT.

Witnesses:
 WILHELM WEIDNER,
 HERMANN BARTSCH.